J. L. WARE.
PROCESS OF FORMING TWINE.
APPLICATION FILED JAN. 19, 1914.
1,165,819.
Patented Dec. 28, 1915.
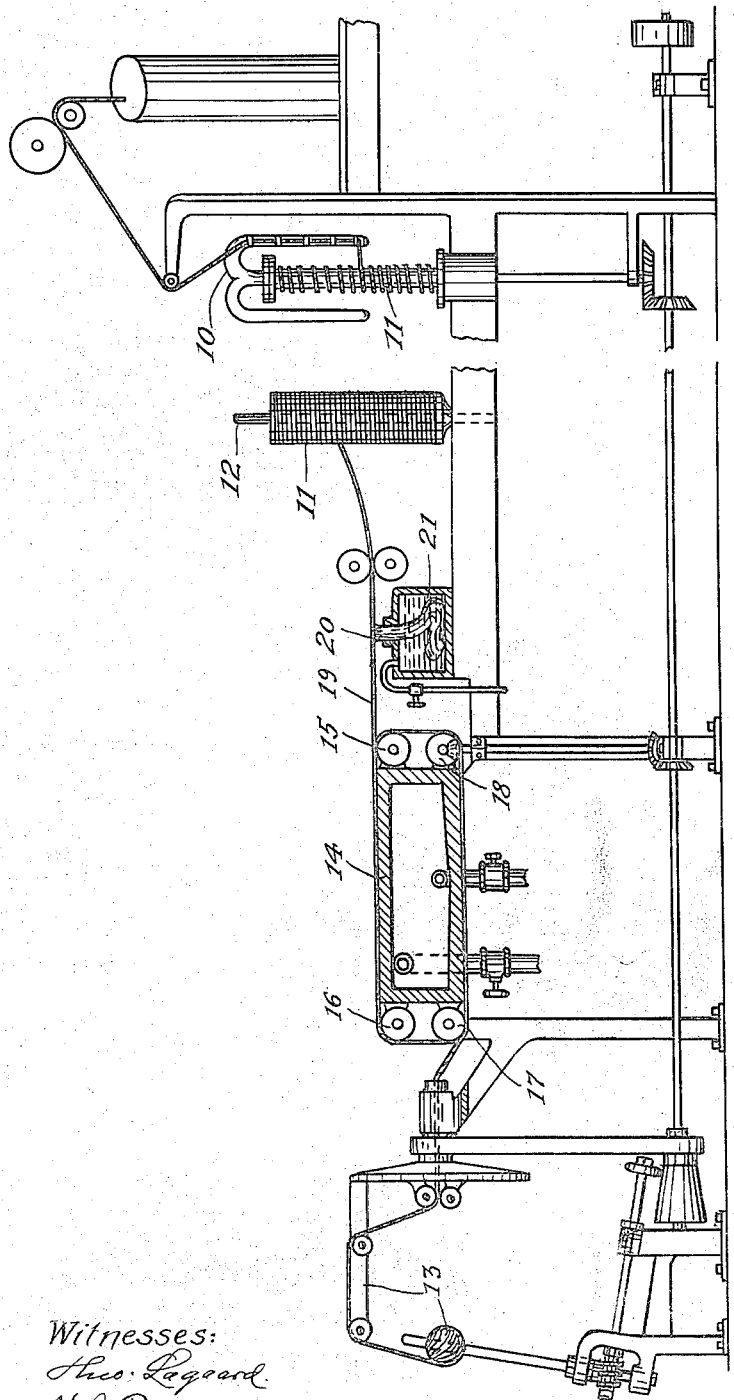
Witnesses:
Theo. Lagard.
H. A. Bowman.
Inventor:
Joseph L. Ware.
By
his Attorney

UNITED STATES PATENT OFFICE.

JOSEPH L. WARE, OF ST. PAUL, MINNESOTA.

PROCESS OF FORMING TWINE.

1,165,819.    Specification of Letters Patent.    Patented Dec. 28, 1915.

Application filed January 19, 1914.   Serial No. 812,942.

*To all whom it may concern:*

Be it known that I, JOSEPH L. WARE, a citizen of the United States, residing at St. Paul, in the county of Ramsey and State of Minnesota, have invented certain new and useful Improvements in Processes of Forming Twine, of which the following is a specification.

My invention relates to a process of forming twine of short-fiber material, particularly flax straw as it comes from the thresher which has been roughly broken and hackled without having been retted and necessarily consists of an assortment of fibers of various lengths, many very short, and of fibers not yet clean of the shive or fragments of the cortex of the flax stem.

Many efforts have been made to utilize the fiber of ordinary threshed flax straw for the making of binding twine. It has been found necessary, in order to get a twine of such fibers that will not separate in places, to give the twine a very large amount of twist. The resulting product has sufficient tensile strength and continuity, but has in practice proved valueless, because as the twine is unrolled from the ball it kinks to such an extent as to prevent handling by the wrapping and tying mechanisms of the grain binder. I have discovered that if twine so formed is subjected to a certain amount of heat, preferably being first somewhat moistened, the gum which accompanies the unretted fibers will become softened and the fibers will be set into the close twist which has been given them, with the result that a free flowing and non-kinking twine is produced.

By the employment of my process I am able to take ordinary flax straw after the same has been run through a rough breaking and hackling process and spin the same with such a degree of twist as to give a hard and effective twine for binder purposes and heat the twine after such twisting so that its tendency to kink will be entirely removed. It is not absolutely necessary to apply the heat to the twine before balling. The balls may be subjected to heat by baking, or otherwise, which will soften the gum and remove the kinking tendency. This, however, has disadvantages in that it is impractical to moisten the entire ball, and before the inner portions thereof are sufficiently heated the exterior portions of the ball may become so heated as to make such twine overdry and brittle.

The drawing illustrates somewhat diagrammatically an apparatus for practising my invention, part of said apparatus being shown in section.

A spinning and twisting mechanism is indicated somewhat diagrammatically at 10 by which the aforesaid short-fiber material is made into a twine having an excessive amount of twist, the same being wound upon spools 11 as it is formed. Between the usual spindles 12 of a balling machine for supporting the filled spools 11 and the balling mechanism indicated at 13, I arrange a steam chest or table 14 having a series of rollers 15, 16, 17 and 18. The twine 19 from the spool 11 passes around the rollers 15 and on either side of the steam chest 14 one or more times, as may be desired. At least one of the rollers, as roller 18, will be positively driven so that the twine 19 may be continuously carried about the steam chest 14. A moistening wick 20, extending from a receptacle 21 filled with water, is preferably provided over which the twine 19 passes on its way to the steam table 14, the twine thereby being moistened to the proper degree before the heating. After having passed around the steam table the requisite number of times, which will depend upon the extent of the table and the rate of feed of the twine, it passes to the balling machine, where it is formed into a ball and the twine so balled will be entirely free from any kinking tendency, this result having been attained by the heating of the twine in its passage from the spool 11 to the baller 13.

I claim:

1. A process for making twine of short-fiber unretted flax which consists in forming a twine of such flax fiber having an excessive amount of twist and thereafter heating the twine so formed until the gum of the fiber has become softened and the fibers become set in their twisted positions.

2. A process for making twine of short-fiber unretted flax which consists in forming a twine of such flax fiber having an excessive amount of twist and thereafter moistening the twine so formed and heating the moistened twine until the gum of the fiber has become softened and the fibers become set in their twisted positions.

3. A process for making twine of short-fiber unretted flax which consists in forming a twine of such flax fiber having an excessive amount of twist and heating said twine as it passes from the spool to the baller until the gum of the fiber has become softened and the fibers become set in their twisted positions.

4. A process for making twine of short-fiber unretted flax which consists in forming a twine of such flax fiber having an excessive amount of twist and thereafter moistening the twine so formed and then heating said twine as it passes from the spool to the baller until the gum of the fiber has become softened and the fibers become set in their twisted positions.

In testimony whereof I affix my signature in presence of two witnesses.

JOSEPH L. WARE.

Witnesses:
F. A. WHITELEY,
H. A. BOWMAN.